H. D. COLMAN.
WARP DRAWING MACHINE.
APPLICATION FILED MAY 18, 1908.
1,062,271.
Patented May 20, 1913.
12 SHEETS—SHEET 1.
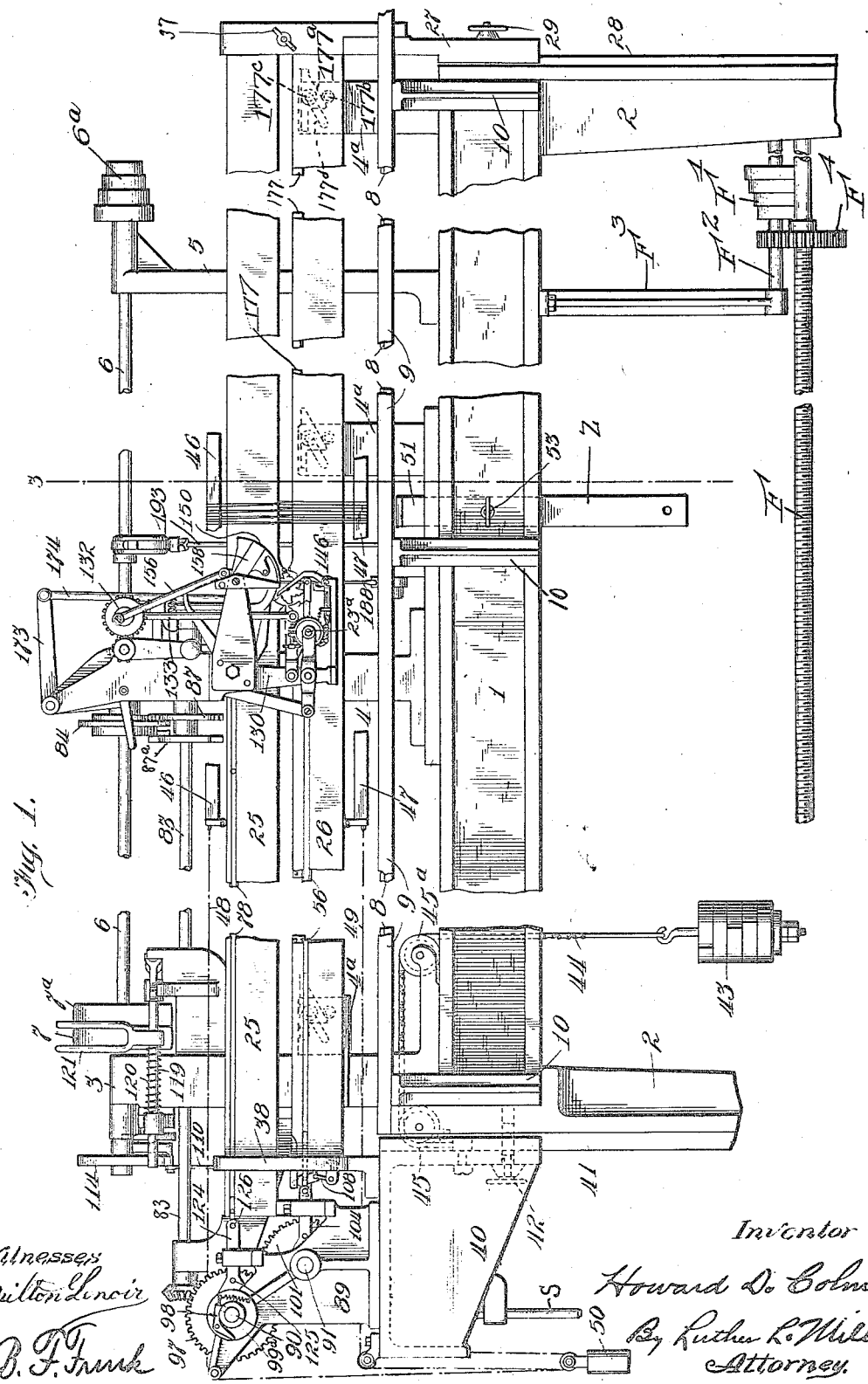
Witnesses
Milton Lincoir
B. F. Frink
Inventor
Howard D. Colman
By Luther L. Miller
Attorney.

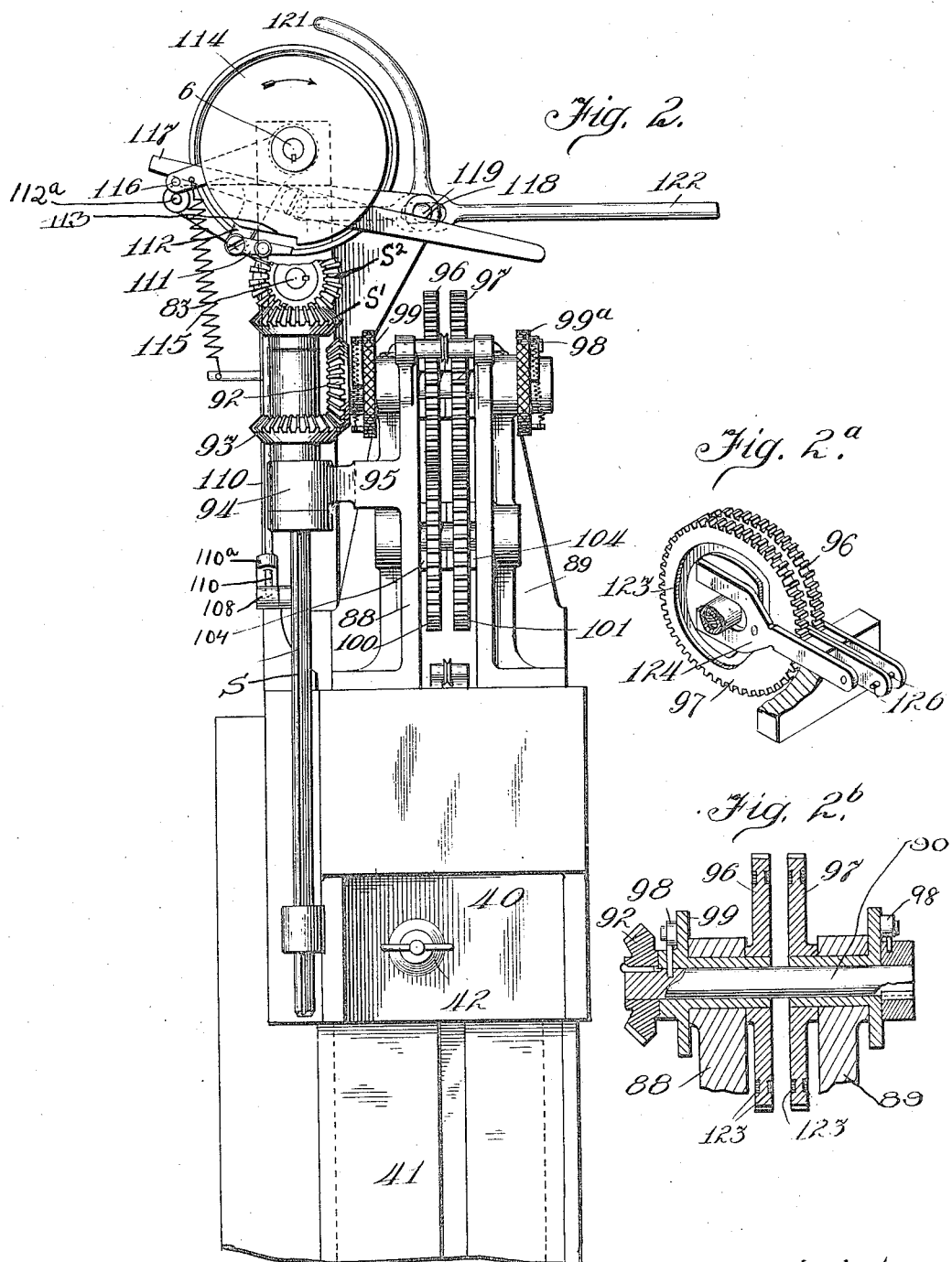

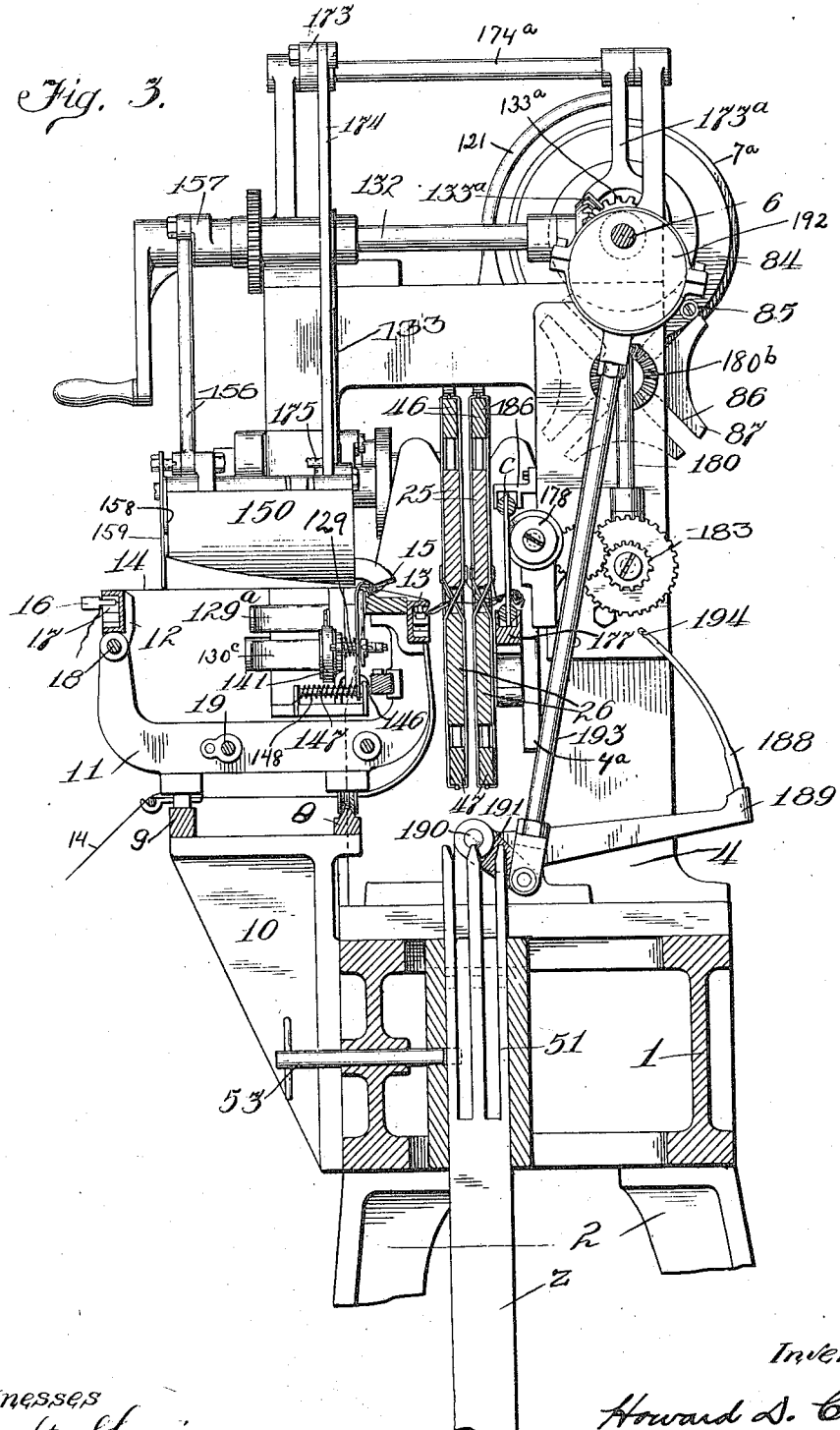

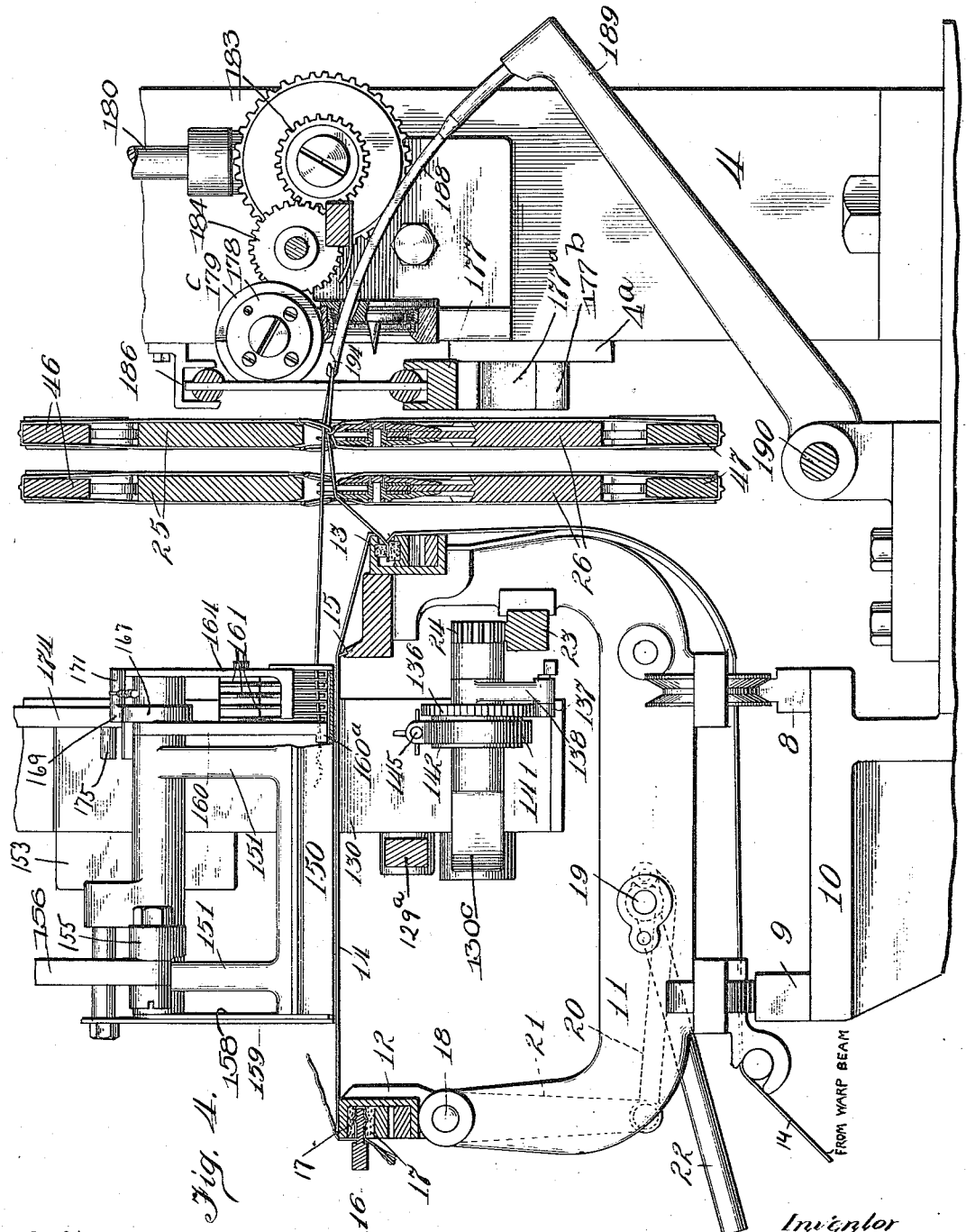

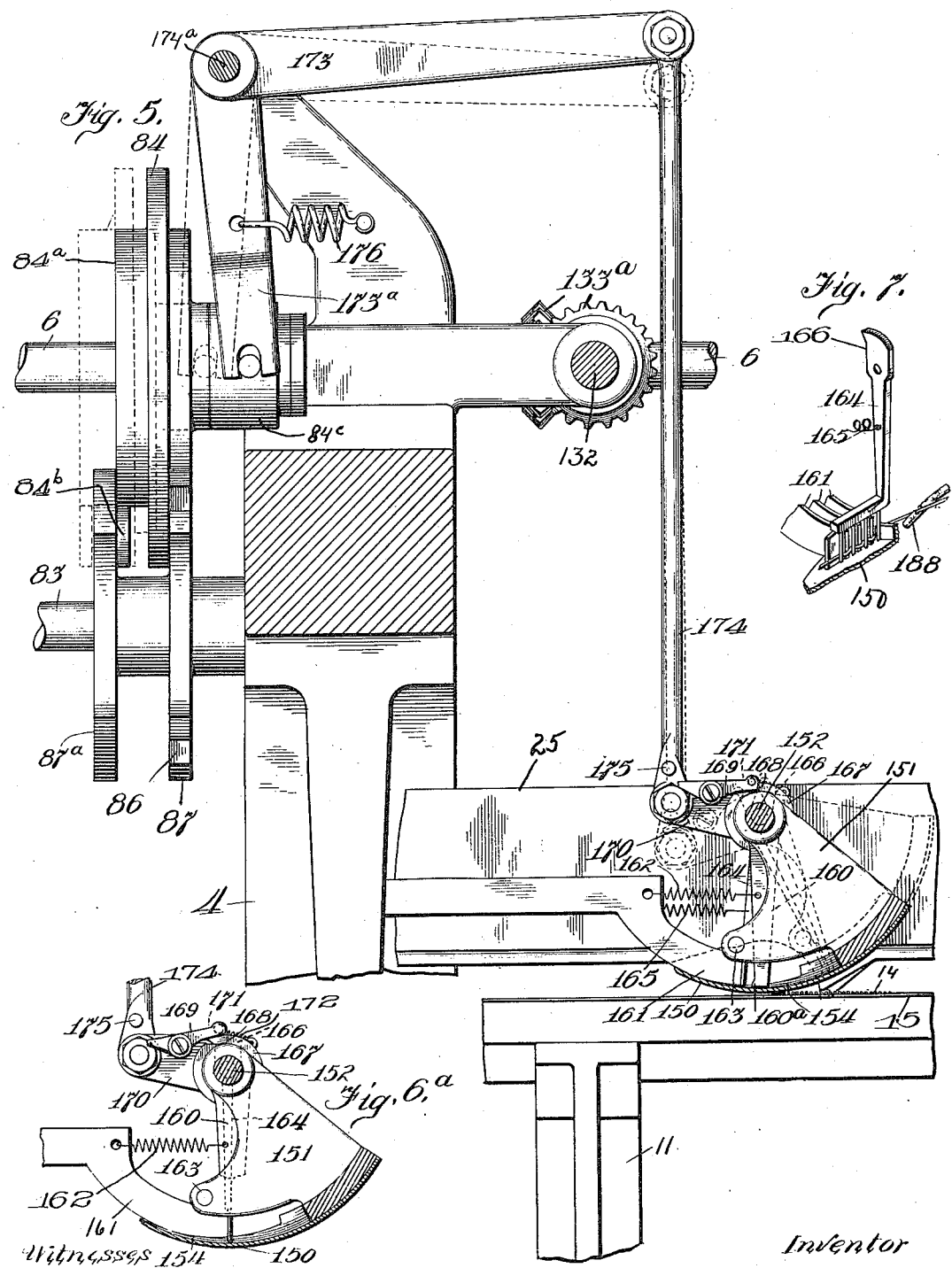

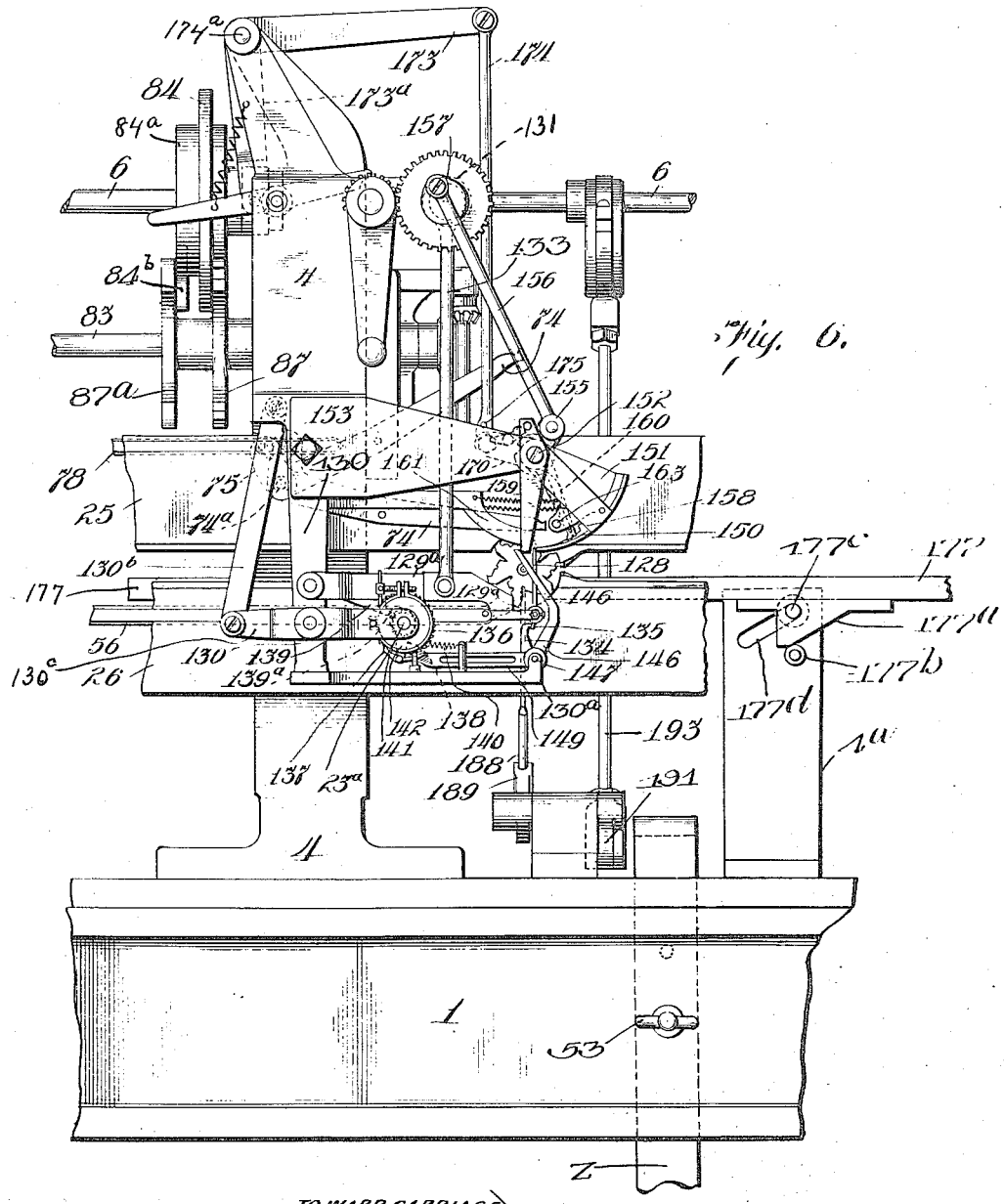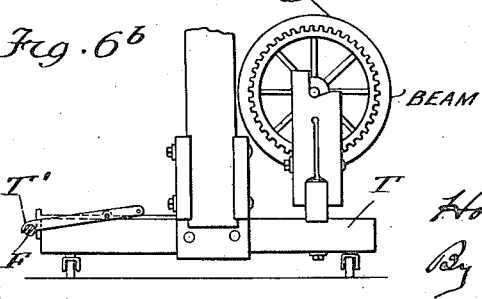

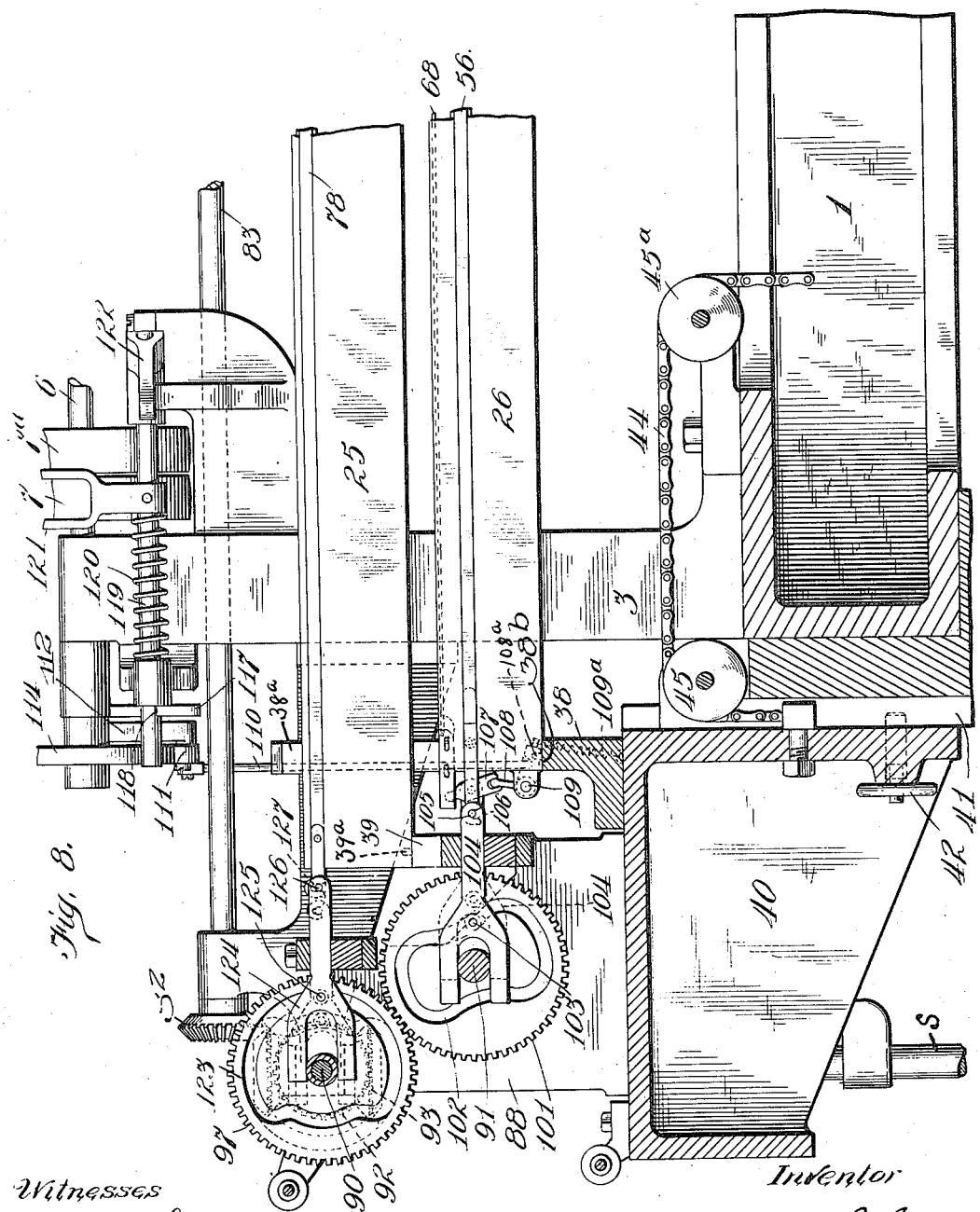

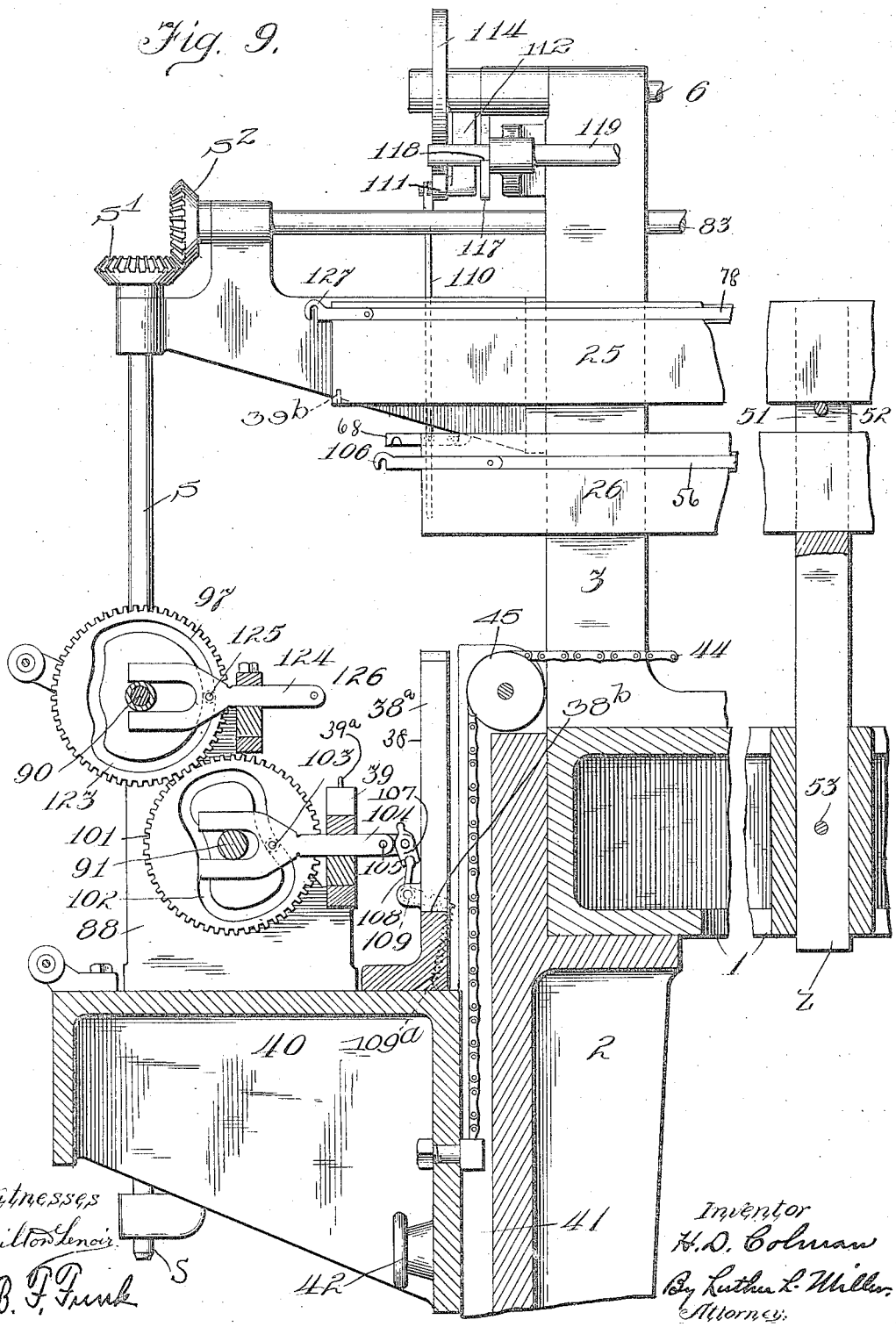

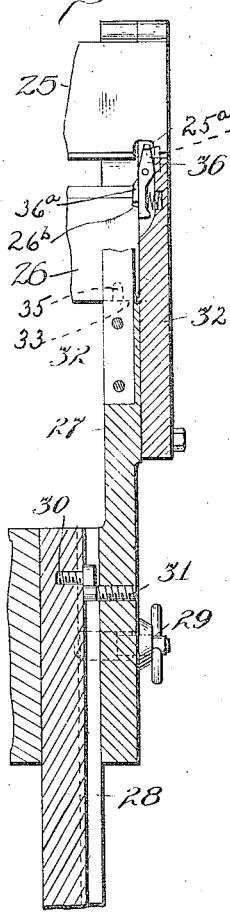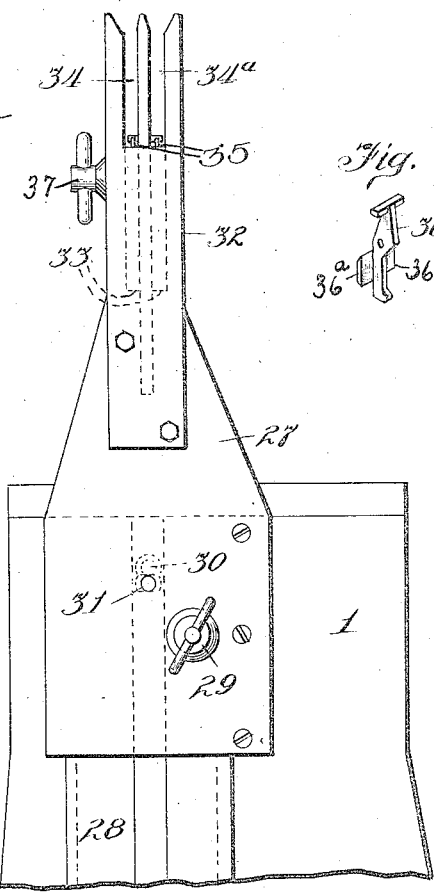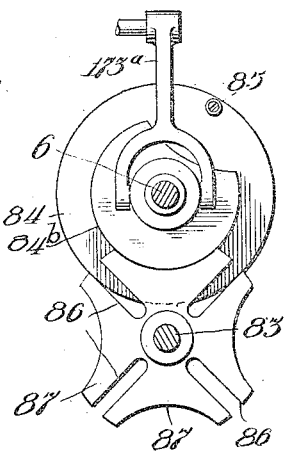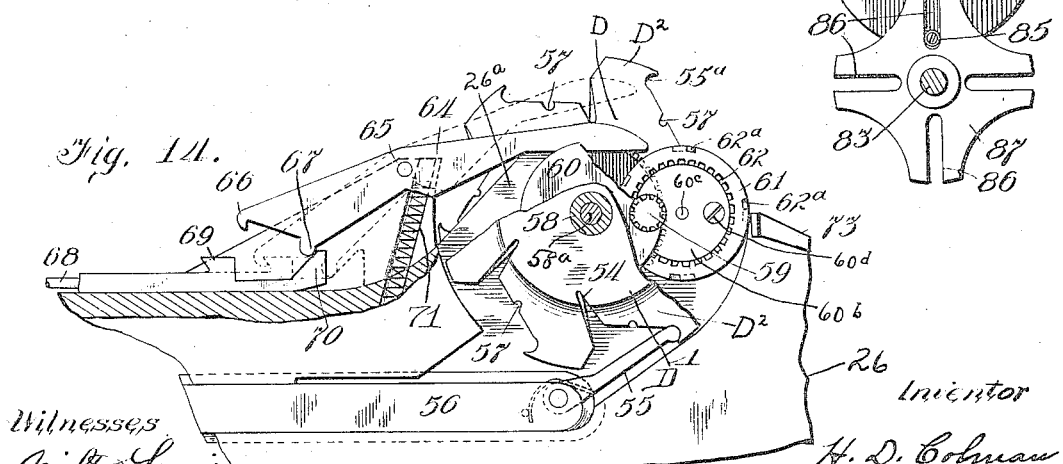

H. D. COLMAN.
WARP DRAWING MACHINE.
APPLICATION FILED MAY 18, 1908.
1,062,271.
Patented May 20, 1913.
12 SHEETS—SHEET 10.
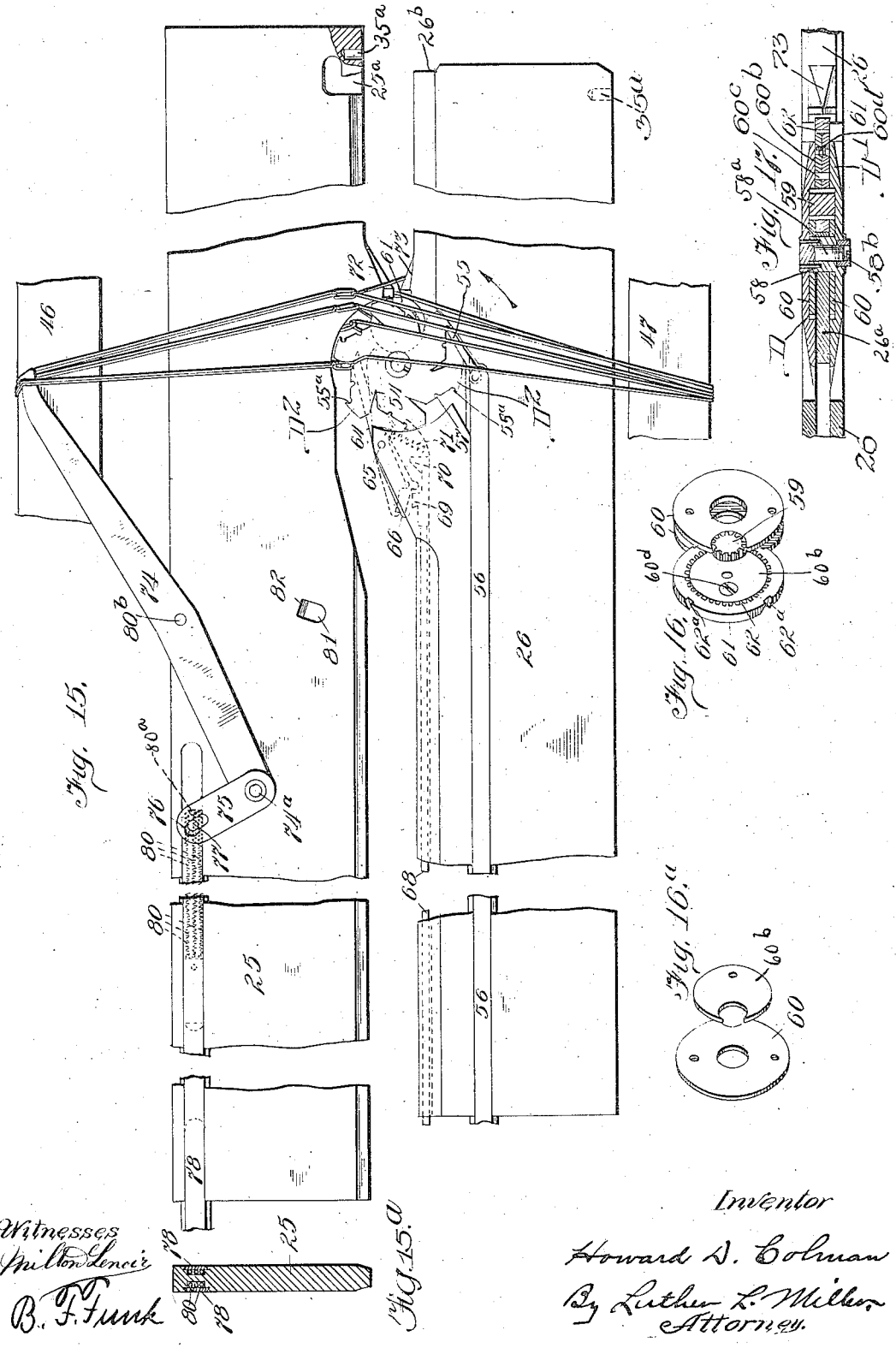
Witnesses
Milton Lencir
B. F. Funk
Inventor
Howard D. Colman
By Luther L. Miller
Attorney.

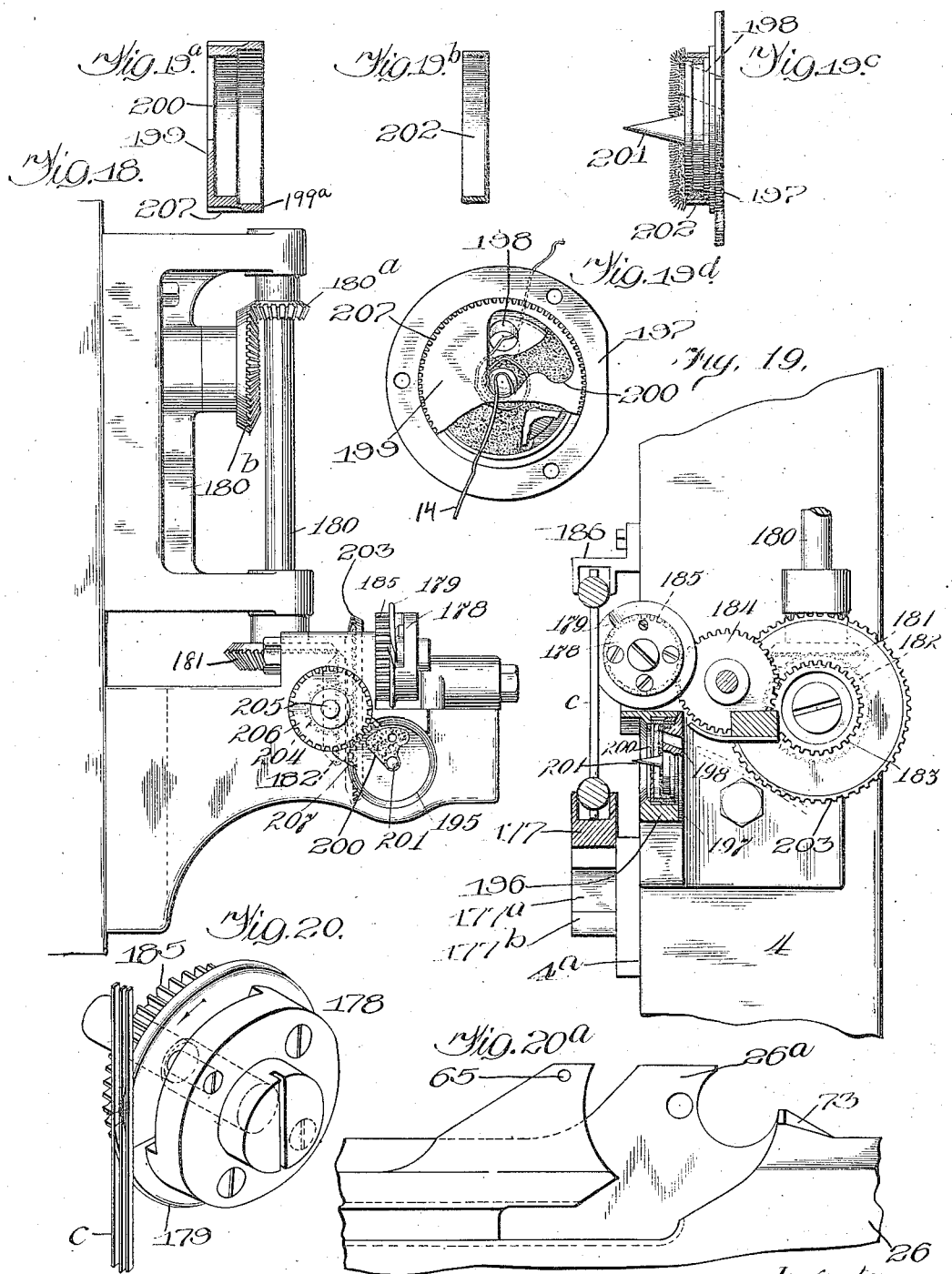

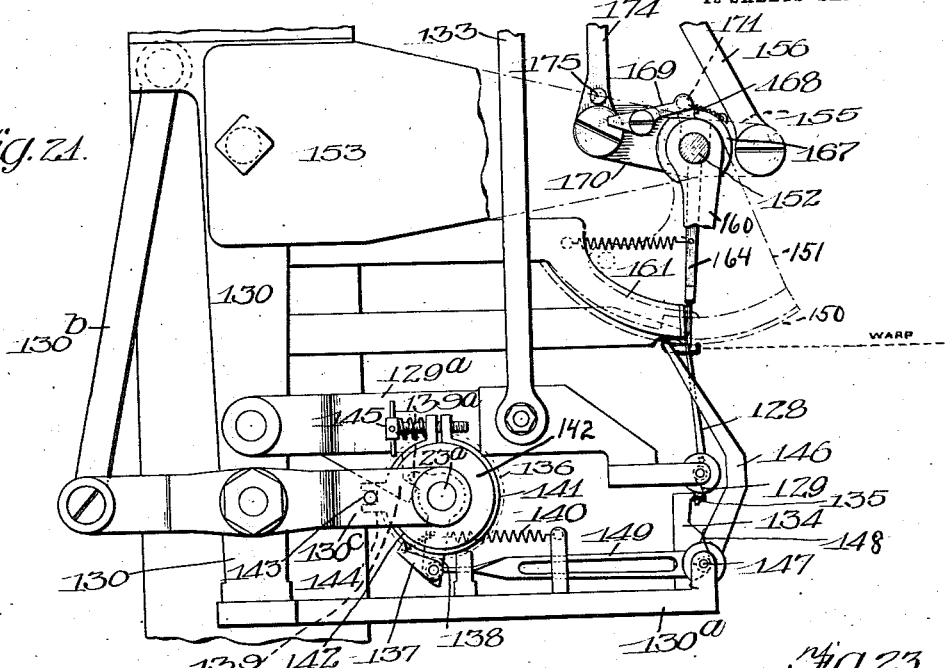
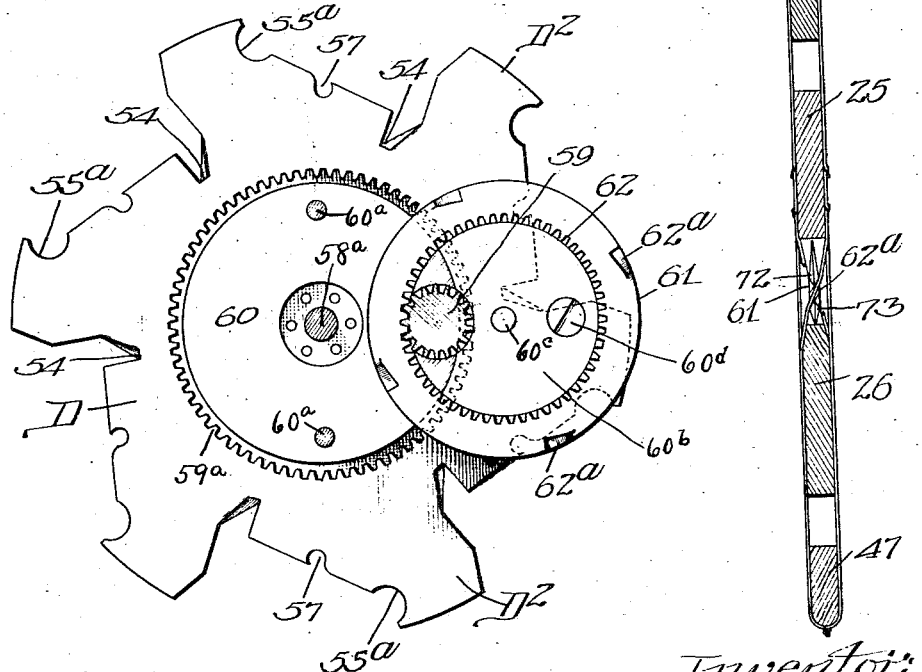

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

WARP-DRAWING MACHINE 1,062,271.        Specification of Letters Patent.        Patented May 20, 1913.

Application filed May 18, 1908. Serial No. 433,459.

*To all whom it may concern:*

Be it known that I, HOWARD D. COLMAN, a citizen of the United States, residing at Rockford, in the county of Winnebago and State of Illinois, have invented certain new and useful Improvements in Warp-Drawing Machines, of which the following is a specification.

This invention relates to machines for placing warp threads through the eyes of flexible heddles, particularly those heddles made of cotton or similar material.

One of the objects of the invention is to provide mechanism for expeditiously and accurately selecting proper heddles for determined warp threads, and for insuring the proper placing of the respective warp threads through the respective heddle eyes.

Another object of the invention is to provide means for throwing out certain operating mechanism in the event that the proper heddle eye is not selected.

Another object of the invention is to provide means whereby the operation of the eye puller for the heddles will insure the operation of the heddle selector.

Another object of the invention is to provide means whereby a certain tension will be placed upon the heddles at about the time the drawing-in needle is to pass through the heddle eye with the thread.

In the drawings, Figure 1 is a side elevational view of a machine constructed in accordance with my invention, parts being broken away to shorten the view, and the warp carriage and the beam truck being omitted. Fig. 2 is an end elevation of the machine, the counter-balance weights for the harness being removed. Fig. 2ª is a detail perspective view of the two heddle tension member operating cams. Fig. 2ᵇ is a sectional view through the heddle tension member operating cams. Fig. 3 is a transverse sectional view on the line 3 of Fig. 1. Fig. 4 is an enlarged transverse sectional view through the warp carriage, harnesses, reed, twisting mechanism and some of their coöperating parts. Fig. 5 is an enlarged view of the Geneva stop driving mechanism and the thread separating mechanism. Fig. 6 is a detail side elevation of the separator showing the parts in their normal positions, to wit when the separator has taken a thread. Fig. 6ª is a detail view of the thread separator and part of its associated mechanism. Fig. 6ᵇ is a detail view illustrating the movable truck which carries the warp beam. Fig. 7 is a detail perspective view of the feeling mechanism to determine whether a thread has been set off by the separator. Fig. 8 is a fragmentary longitudinal vertical sectional view taken through the end of the machine, showing the mechanism for driving the heddle selectors, the mechanism for operating the sensitive feeler devices for the heddles, the driving mechanism for the harness strand tightener and the throw out mechanism operated by the heddles. Fig. 9 is a view similar to Fig. 8 but showing the knee, which carries the heddle selector operating cams and strand tightener cams, lowered to permit the heddles to be removed from their supporting bars. Fig. 10 is a side view, partly in section, showing the support for the harness bars at the head end of the machine. Fig. 10ª is a detail perspective view of the dog for locking the harness bars in place. Fig. 11 is a face view of the support shown in Fig. 10. Figs. 12 and 13 are end views of the Geneva stop motion, showing the parts in two different positions during their normal movements. Fig. 14 is a detail view, partly in section and partly broken away, showing the heddle selector and sensitive stop finger. Fig. 15 is a side view of the harness bars with several harness strands thereon, the heddle selecting mechanism being shown as engaging some of the heddles. Fig. 15ª is a cross-sectional view through one of the harness bars and the eye puller actuators coöperating therewith. Fig. 16 is a detail in perspective showing the means for actuating the heddle selector. Fig. 16ª is a detail perspective view of one of the selector holder plates. Fig. 17 is a transverse sectional view through one of the heddle selectors. Figs. 18 and 19 are side and end views, respectively, of the reed feeder and dent separator and the thread-twister for the drawn-in ends. Figs. 19ª, 19ᵇ, 19ᶜ and 19ᵈ are detail views of said thread-twister. Fig. 20 is a perspective view of the reed feeder and dent separator showing its relation to the reed. Fig. 20ª is a fragmental view of one of the lower harness bars. Fig. 21 is an enlarged view of the selector for the warp threads and some of its associated mechanism. Fig. 22 is an enlarged view of the heddle selector and eye puller. Fig. 23 is a sectional view through the harness shafts and harness bars just in front of the selector, a heddle strand being shown in one of the heddle notches.

Referring now to the drawings by numerals of reference, the bed 1 of the machine is shown as being supported upon standards 2, 2. The upstanding posts 3, 4 and 5 on the bed are provided with bearings to support the main or drive shaft 6. The shaft 6 may receive motion from any suitable source, in driving connection with the pulley 7, fast on the shaft, a loose pulley 7ª being also carried by said shaft 6. The rails 8 and 9 are supported upon the bed 1 by the brackets 10 (see Figs. 1 and 4). These rails 8 and 9 are adapted to receive a warp carriage 11 movable thereon so as to present successive threads to the selector mechanism preparatory to being drawn in. The carriage is provided with spaced warp clamps 12 and 13 so that the warp threads 14 may be held therebetween and deflected from a straight line by the longitudinally movable ribbon 15, said ribbon being adapted to be shifted by any suitable means.

By reference to Fig. 4 it will be observed that the warp clamps may include the removable insertion bars 16 introduced between the resiliently lined, clamping members 17 whereby the threads will be held against slipping or pulling loose from the clamps. One of the clamps (in this instance 12) may swing with relation to the other to stretch the threads. The swinging clamp 12 is pivoted at 18, to the carriage 11 and after the warp is secured to said clamps the one designated 12 may be moved away from its complementary member 13 by actuating the rock shaft 19 eccentrically connected to the link 20 which engages the arm 21 connected to the pivot 18 of said clamp 12. The shaft 19 may be actuated by the lever 22 (see Fig. 4). The carriage 11 may be moved along the rails 8 and 9 by a rack and pinion 23, 24, the pinion being driven by suitable mechanism to be described hereinafter.

As will appear to those familiar with warp-drawing machines, the warp beam may be fed with the warp carriage 11 from the head toward the foot of the machine. In order to accomplish the feed of the warp beam concurrently with the warp carriage, the beam may be supported in a truck T provided with a threaded portion or half nut T' (Fig. 6ᵇ) to engage the screw F (Fig. 1) so that the truck will be progressively fed during the drawing-in process. The screw F may be driven from the main shaft 6 through the pulley 6ª around which a belt may pass to the pulley F' supported by shaft F² in the bracket F³ and in bearings in one standard 2, the shaft F² carrying a gear to mesh with the gear F⁴ on the shaft F.

Suitable mechanism is provided for selecting, severing and placing warp threads through the eyes of a cotton harness, and the means whereby the desired result may be accomplished will be apparent by reference to the remaining portions of this description and reference to the accompanying drawings.

Each harness is supported upon two bars which I designate respectively the upper harness bar 25 and the lower harness bar 26. These bars 25 and 26 are supported in the machine in a peculiarly novel manner so as to expedite the application of the harnesses to and the removal thereof from the same. The bar-supporting standard 27 at the head end of the machine is vertically adjustable on a dovetail rib 28 whereby the standard may be moved below the plane of the bars 26 and out of bar supporting position. In either supporting or non-supporting position the said standard 27 may be held in its determined adjustment by a set screw or pin 29 (see Fig. 10). The upward movement of the standard may be limited by the two stop pins 30 and 31, one in the machine base and the other in the standard. The preferred construction of the standard 27 may best be understood by reference to Figs. 10 and 11. In Fig. 10 the standard is shown as being sectional. The fork 32 is provided with shouldered recesses 33 to receive the ends of the bars 26 and a forked end to provide slots 34 and 34ª to enable the ends of the top harness bars 25 to pass through and engage the forked end of the section 32.

35 are pins upon the fork 32 adapted to enter sockets 35ª (Fig. 15) in the harness bars for properly positioning said bars upon their supports.

The lower ends of the upper bars 25 are recessed at 25ª (Figs. 10 and 15). The standard 27, or, to be exact, the section 32 of the standard carries a spring-pressed dog 36 which has an upper T-head; this dog being provided for the purpose of engaging the notches 25ª in the respective top harness bars so as to hold them against accidental displacement. The dog 36 may be operated by the hand wheel 37. The adjacent ends of the lower bars 26 are notched, as at 26ᵇ, to receive projections 36ª upon the dog 36 for holding said bars against displacement, as will appear more fully hereinafter. The opposite ends of the bars 26 are supported by a standard 38 (Figs. 8 and 9) having a slot 38ª therein for each of said bars 26, each bar resting upon the end wall 38ᵇ of its slot. The adjacent ends of the bars 25 rest upon a standard 39 and extend through the slots 38ª in the standard 38. Upon the standard 39 are positioning pins 39ª adapted to enter recesses 39ᵇ in the lower edges of the bars 25. The standards 38 and 39 are carried by the vertically adjustable knee 40 slidable upon a dovetail rib 41 on the foot end of the machine and adapted to be held in its adjustable position by the pin or set screw 42 which may engage the standard of the machine. The knee, in its downward movement, will leave the foot end of the harness bars free so as to permit the easy removal of the harnesses after they have been drawn in, and in order to render this knee easily adjustable I provide a counter-balance weight 43 (Fig. 1) which has a flexible connection 44 with the knee, said flexible connection passing over the pulleys 45 on the standard 3 and 45ª on the base 1. The knee carries certain heddle selector and strand placer operating mechanism, but this will be described hereinafter.

The harness shafts are shown as consisting of two movable bars 46 and 47 having rollers on their ends to pass over the top edges of the top bars 25 and the lower edges of the bottom bars 26 (see Fig. 1). In order to move the harnesses through the machine and past the operating mechanism (to be described later) I provide a gravity feed comprising cords 48 and 49, each having one end connected to its harness or shaft and the other to the knee 40. These cords 48 and 49 support a weight 50 which will be sufficient to pull the harnesses along the bars 25 and 26. In actual practice I find that it is sometimes desirable to have the upper harness shaft move slightly in advance of the lower harness shaft, and this can be effected by shortening up the cord 48 with respect to the cord 49. After the proper adjustment is made, the relative positions of the upper ends of the heddles with respect to the lower ends thereof will remain the same. The harnesses are passed on to the head ends of the bars 25 and 26 preparatory to the drawing-in operation and they are removed from the foot ends of said bars after the drawing in has been effected. When either the standard 27 or the standards 38 and 39 are to be withdrawn as supports for the bars 25 and 26, either to introduce the harnesses onto the bars or to remove them therefrom, I find it desirable to provide a temporary support for said bars, and one is shown in Figs. 1, 3 and 9. Preparatory to removing the standard 27 or its fellows, I move the auxiliary support Z (which is carried by the base 1) up into supporting position so that the forked end 51 receives the lower bar 26 on the floor of the slots in the forked end, and the upper bar is supported by a pin 52 (Fig. 9) passing through openings in the said end and above the bar 26. The auxiliary support Z may be held in its adjusted position by the fastening device 53 which passes through a part of the base 1 and engages the member Z. When the knee 40 is lowered and the harness bars 25 and 26 are being supported by the standard 27 and the support Z, the dog 36 prevents the bars 25 and 26 from tilting under the weight of the harnesses carried on the foot end of said bars 25.

The bars 25 and 26 carry certain mechanism for selecting, positioning or eye pulling and tightening the harness strands, and these will now be explained. The harness strand selecting and positioning or eye pulling means, the sensitive feeler means and the drawing-in needle work in unison, that is, one operates with respect to another.

For convenience, I permit the mechanism for each harness, referred to in the preceding paragraph, to be carried by one of the harness bars, in this instance, the lower bars 26.

The eye pulling or positioning device for each harness is shown as consisting of a pair of disks D and D' (Figs. 17 and 22) provided with peripheral fingers D² arranged in circular series and adapted to successively engage successive strands of the harness. Each finger has a long edge and a short edge. At the juncture of the long edge of one finger with the short edge of an adjacent one, is an approximately V-shape kerf or notch 54 for the reception of one of the harness strands at the lower end of an eye. The adjacent notches (for there are corresponding ones in each disk) are cut on the same angle, so those in the disk D are in angular alinement with those in disk D'. The long edge of each finger is provided with a socket notch 55ª for the reception of an actuating device shown as a pawl 55 receiving an intermittent motion by a reciprocatory rod 56 to which movement is imparted by suitable means to be referred to later on. It will be understood that a thread is to be drawn through an eye of one harness and the next thread to be placed through an eye of the other harness. The eye-selector and puller devices are therefore actuated alternately.

57 are guide notches interposed, one between the base of each finger and its free extremity. The purpose of the notches 57 is to guide or accommodate the drawing-in needle in moving past the eye puller device for one of the harnesses when a thread is to be placed in the eye of a heddle held by the eye puller device of the other harness. The step by step movements of the two eye-puller devices first bring a notch 54 in the rear puller device and a notch 57 in the front puller device into operative alinement for the passage of the needle, and then a notch 54 in the front puller device and a notch 57 in the rear puller device are operatively alined.

As will be apparent by reference to Figs. 16 and 17, the disks carrying the heddle-engaging fingers are spaced apart by a sleeve 58 on one of the disks and which is doweled into the other disk so that said disks rotate together. The disks are then fastened together by a pin 58ª carried by one disk and which passes through sleeve 58 to receive a nut or other fastening device 58ᵇ. The inner face of each disk is recessed; in the edge of each recess are teeth 59ª meshing with the teeth of a pinion 59 loose in the selector support. Said support comprises two disks 60 having central bearing openings to receive and rotatably support the sleeve 58, said disks being secured to a web 26ª of the bar 26 by means of screws 60ª. The outline of the web 26ª is indicated in Figs. 14 and 20ª. Integral with or otherwise fixed to the disks 60 are disks 60ᵇ, the parts 60 and 60ᵇ being secured together by a dowel pin 60ᶜ and a screw 60ᵈ, as well as by the screws 60ª.

The selector 61 is here shown as ring-shape, being provided with internal teeth 62 meshing with the teeth of the pinion 59 which in turn is in gear with the internal teeth 59ª in the disk recesses. By reference to Fig. 16ª it will be apparent that the selector support may be sectional, as herein described, in order to get the ring selector into operative position with respect to the pinion, eye puller disks, etc. The intermittent movements imparted to the eye-puller disks D and D' by the pawls 55 are communicated to the selector 61 through the gear train 59ª, 59, 62.

The exterior of each selector 61 is provided with strand-engaging notches 62ª (Figs. 16 and 22), each alternate one being cut at a different angle than the preceding one. The notches in the present instance are alternately inclined at angles of about 60 degrees. The object of this arrangement is to insure the selection of the proper harness strand. A harness is ordinarily arranged on its shafts to provide what is known as a forward and a rear heddle, and in the drawing-in process it is desirable to place a thread through first a front heddle eye and then a rear heddle eye. As the harnesses are leased between the bars 25 and 26 (Fig. 23), one of the lower strands of each forward heddle crosses to the rear side, and one of the lower strands of each rear heddle crosses to the forward side. These crossing strands are the ones engaged by the selector 61. The crossing strands of the forward heddles are of course disposed at a different angle from the angle of the crossing strands of the rear heddles; so, if the selector picks up a forward heddle in the beginning of the operation of the machine, the next succeeding notch in the selector will pass by a strand of a forward heddle, should one bear against it, and fail to select it, but just as soon as a rear heddle presses against the periphery of the selector, the notch inclined to pick it up will insure its selection. Thus, first a front heddle and then a rear heddle will be selected and this order will be followed throughout the drawing-in process. It will be understood that the heddle strands stand in front of the selector 61, that they are under some tension by reason of the weight of the harness shaft 47, and that the weight 50 holds the strands against the selector 61. The latter catches said strands in its notches 62ª and carries them to a point within reach of the puller fingers D². The weight 50 with its coöperating cords furnish a gravity feed for the harnesses and this gravity feed is controlled by the eye puller and positioner, which together with the selector will permit only one heddle to pass at a time and that at determined intervals, although these intervals will be very frequent.

The bars 25 and 26 are provided with guides 72 and 73 (see Fig. 15) in the form of ribs or projections, these being provided to properly present the crossing heddle strands to the selector preparatory to being taken by the eye pullers. In the top edge of the bars 26 are certain heddle feeler devices, one for each bar, and these feeler devices are arranged so that should the eye puller fail to pass an eye along at the proper time, the machine will be thrown out of gear.

The sensitive feeler may comprise a finger or dog 64 (Fig. 14) pivoted at 65 to the lower harness bar and capable of having its toe vibrate between the eye puller disks D and D'. The heel of the feeler is provided with an interlocking projection 66 and a contact projection 67. Slidable longitudinally in each bar 26 is a rod 68 having at one end (see Fig. 15) a projection 69 for interlocking engagement with the projection 66. The rod 68 is also provided with a cam projection 70 to contact with the projection 67 so as to force the toe of the feeler down against the action of the compression spring 71 which has a normal tendency to elevate said toe. In the normal operation of the machine the toe of the feeler 64 is held down by the positioned heddle eyes. As each eye passes along after being provided with a warp thread the spring 71 tends to tilt the feeler into the dotted-line position shown in Fig. 14, but such tilting is prevented, during the slight interval between successive eyes, by the projection 70 which is brought into contact or into position to contact with the projection 67 in the reciprocations of the rod 68.

74 (see Fig. 15) designates a heddle tightener, of which there are two for each harness. In the present machine provision is made for four. Each heddle tightener is shown as pivoted at 74ª to a top bar 25 and is provided at its lower end with a rigid elbow extension 75 having an irregular slot 76 therein to receive a pin 77 of an actuator. The actuator preferably consists of a bar 78 in which the pin 77 is fixed.

80 are springs connected to the bar 78 and a pin 80ª fixed in the arm 75, whereby a yielding connection is provided between the tightener and its actuator. I prefer to employ a plurality of small springs instead of one large spring because the small springs may be conveniently confined in a comparatively small space and they will be quite as effective as one large one. By reason of the springs 80 and the irregular opening 76 the lever 75 is permitted to have a limited movement with respect to the bar 78 so that provision will be made to prevent severe strains upon the harness strands due to variations in the length of the heddles, particularly at the limit of the upper movement of the tightener. The tightener 74 acts upon one heddle at a time. During the downward movement of the tightener the projection 80ᵇ between the ends thereof will be caused to enter the recess 81 in its supporting bar, whereby the tightener will lie flat against said bar 25 to permit the proper heddle to pass over the end and on the outside of the tightener. By the time said heddle is well over the end of the tightener the actuation thereof by the slide bar 78 will cause the pin or projection 80ᵇ to pass out the recess 81, in doing which it will ride up the inclined edge 82 of said recess and move the free end of said tightener away from the bar 25 so as to cause it to pass on the outside of and clear the adjacent strands, and place tension upon the positioned heddle. When the heddle is thus placed under tension and drawn into an approximately straight line, with the lower strands straddling the puller disks D D', the eye is in proper position for the passage of the drawing-in needle.

I shall now proceed to describe the means for imparting the desired movements to the eye selectors and pullers, the sensitive feelers and the heddle-strand tighteners. As heretofore mentioned, the shaft 6 may receive motion from a suitable source of power through the medium of a belt passing over the pulley 7, but when the belt is shifted to the loose pulley 7ª the belt merely runs idle. If the shaft 6 is being driven, motion may be imparted to the shaft 83 by a Geneva stop motion comprising the sliding disk 84 (Fig. 1) splined on the shaft 6, which disk has a pin 85 (Figs. 12 and 13) adapted to enter one of the four radial slots 86 in a disk 87 fixed upon the shaft 83. It may be well to state here that this arrangement will cause one complete revolution to be imparted to the shaft 83 for every four revolutions of the shaft 6. Upon the shaft 83 is fixed a stop wheel 87ª (Fig. 6) of the same diameter as the star wheel 87 and having its periphery concaved similarly to said star wheel to receive the hub 84ª of the pin disk 84 when said pin disk is moved longitudinally of the shaft 6, as explained hereinafter. Upon the hub 84ª is a radial leaf 84ᵇ adapted to rotate in a vertical plane at the left-hand side of the stop wheel 87ª when the pin disk 84 is shifted as before mentioned. Certain mechanism is provided for automatically disconnecting the disks 84 and 87, but this will be referred to hereinafter. When the shaft 6 is in driving engagement with the driven shaft 83 through the Geneva stop motion, the vertical shaft S will be driven through the bevel gears S' and S², one on the vertical shaft and one on the shaft 83. The mechanism actuated by the shaft S is carried by the knee 40 and inasmuch as the knee is vertically adjustable, the shaft S must have a spline connection with the particular gear 93 (Fig. 2) which it drives. The knee 40 carries two vertical posts 88 and 89 (Figs. 2, 8 and 9) in which are journaled shafts 90 and 91 carrying the cams for assisting in the actuation of the selectors, the eye pullers, the sensitive feelers and the heddle tighteners. The shaft 90 is provided at one end with a bevel gear 92 meshing with a bevel gear 93 splined on the shaft S and held in a bearing 94 in the bracket 95 carried by the post 88. These gears 92 and 93 will remain in mesh irrespective of the position of the knee 40. Sleeved on the shaft 90 are two geared cams 96 and 97 (Fig. 2ᵇ). These cams are normally made fast with the rotary shaft 90 by the spring-actuated dogs 98 (Figs. 1 and 2) which are carried by the knurled disks 99 and 99ª fast on the cam sleeves. The dogs 98 are adapted to enter openings in the shaft 90 and they are adapted to be withdrawn so as to turn either or both cams independently of said shaft. The teeth on the cams 96 and 97 are in mesh with the teeth on the cams 100 and 101 (Fig. 8) fixed upon the shaft 91, so that when motion is imparted to the cams 96 and 97, those designated by 100 and 101 will likewise be moved.

The cams 100 and 101 are provided with approximately 8-shape grooves 102 for the reception of the pins 103 of the yoke-links 104 so that a reciprocating motion may be given to said links. The two cam grooves of each cam are arranged 180° apart, so that the two yoke-links of each cam are reciprocated in opposite directions. One of the yoke-links of each cam 100 101 is separably connected by means of a pin 105 with a notched member 106 fixed to both of the selector bars 56 of the corresponding harness bar 26. The other yoke-link of each cam is separably connected with the feeler rod 68 through a rocking lever 107 which is pivoted intermediate its ends to said yoke-link and engages a recess in the end of said feeler rod. The lower end of the rocking lever 107 is bifurcated to engage an arm of a bell crank lever 108 fulcrumed at 109 on the standard 38, but normally held rigidly against a stop 108ª by the spring 109ª connected to one arm of the lever 108 and to a suitable part of the knee 40.

There are two bars 56 for each harness, one on each side of each harness bar 26; those for each harness work in unison, both being connected to the member 106, so in effect the duplicate bars 56 for each harness act as one bar, imparting the desired movements to the eye puller from both sides of the bar 26.

The sensitively-controlled feeler rod 68 will be actuated every time the eye puller operates (see Fig. 15). When the sensitive feeler rod is caused to move toward the eye puller, the dog 64 will be out of contact with the cam projection 70, and provided a heddle has been selected and is holding the toe of the dog in the position shown in Fig. 15, the rod 68 will be permitted to move away from the eye puller. If, however, no heddle is fed along the bars 25 and 26 the compression spring 71 will depress the heel end of the dog, causing its interlocking projection 66 to interlock with its complementary one 69 on the rod 68 so said rod 68 cannot move. (See Fig. 14.) When the rod 68 locks against movement the fulcrum for the lever 107 changes to the end in engagement with the rod 68 (Fig. 8), the tension spring 109ª is overcome and the bell crank lever 108 is rocked on its bearing. As a result, a vertically reciprocatory movement is given to the rod 110 which normally rests in a recess in the horizontal arm of said bell crank (see Figs. 2 and 8).

110ª is a stationary guide bracket having an opening therein through which the lower end of the rod 110 passes. This rod 110 moves a dog 111 (carried by a yielding lever 112 on the shaft 6) into engagement with the notch 113 in the disk 114 on the shaft 6. As the disk 114 rotates, the lever 112 will be moved against the action of the spring 115 until a projection 116 on said lever tilts a lever 117 out of a notch 118 in the spring actuated longitudinally-shiftable rod 119, so that the spring 120 will move the rod 119 in its supports and cause the belt fork or shifter 121 to shift the belt from the fixed pulley 7 to the loose pulley 7ª, in which event the machine will stop. The belt may be shifted back upon the drive pulley 7 by the hand lever 122.

112ª (Fig. 2) is a fixed stop against which the lever 112 is normally held by the spring 115. The cams 96 and 97 are provided with cam grooves 123, one on each face of each cam disk. The operating part of each groove is set at an angle of 90° to another, and these cams are so arranged that first the strand tightener on one side of a harness bar will be raised, then one on the other bar, then one on the first mentioned bar and then one on the second mentioned bar. Thus there will be four tighteners each one actuated once during one complete rotation of the main drive shaft.

The cams 96 and 97 are connected up with the yokes 124 whose pins 125 follow the paths of the grooves 123 in the cams so as to impart the proper movement to the tightener bars. The ends of the yokes 124 are provided with pins 126 which loosely engage the notches 127 in the ends of the bars 78 so that the yokes 124 and the bars 78 may readily become disconnected when the knee 40 is dropped.

If it is desired to rotate the cams 96 and 97 independently of the shaft 90 in order to move the selector back to cause it to take a heddle, should it miss one, or for any other cause, either or both cams may be temporarily disconnected from the shaft with which they are normally fast by withdrawing the dogs 98. When the harnesses are to be removed after the drawing-in operation has been completed, the knee will be dropped and the mechanism carried by the posts 88 and 89 will assume the position shown in Fig. 9.

Certain mechanism is provided by means of which the warp threads may be selected and placed through the heddle eyes and the dents of the reed. This mechanism can best be appreciated by reference to Figs. 1, 3, 4, 6 and 21.

The thread-selecting mechanism will next be described. The selector proper consists of a small tapered rod 128 (Fig. 21) provided with a minute hook or barb near its forward end of a size suitable to hook or spear one of the warp threads upon which the machine is being operated. Said selector is arranged to be reciprocated across the plane of the warp at a point close to the deflecting ribbon 15, a spring 129 (Fig. 3) yieldingly moving said selector toward the foremost thread of the warp. When the selector lifts the thread from the ribbon 15, said thread springs into a straight line between the clamps 12 and 13, thus moving away from the body of the warp. The selector is mounted in the forward end of an arm 129ª pivotally mounted in the bracket 130. The arm 129ª is rocked by means of an eccentric 131 (Fig. 6) upon a shaft 132, and an eccentric rod 133. The shaft 132 is driven from the drive shaft 6 through the intermeshing bevel gears 133ª (see Fig. 3). A cam finger 134 (Fig. 6) fixed to the bracket 130ᵃ engages the curved rear end of the member 135 in which the selector 128 is fixed and moves the upper end of the selector away from the warp after said selector has engaged a thread.

The warp carriage 11 is moved upon the rails 8 and 9 by means of a pinion 24 (Fig. 4) fixed upon a shaft 23ᵃ (Fig. 6), said shaft being mounted in the bracket 130ᶜ which comprises a brace 130ᵇ, and said pinion engaging a rack bar 23 fixed to the carriage. Upon the shaft 23ᵃ is fixed a ratchet wheel 136 (Fig. 4) the teeth of which are adapted to be engaged by a pawl 137 carried by an arm 138 pivotally mounted upon said shaft. Upon the upward movement of the arm 129ᵃ a finger 139 (Fig. 21) rigidly attached thereto engages a lug 139ᵃ on the hub of the arm 138 and moves said arm to give the pawl 137 a feed movement. A spring 140 restores said arm and said pawl upon the downward movement of the arm 129ᵃ. In order that the warp carriage may not move through momentum, I provide a brake for the shaft 23ᵃ comprising a band 141 encircling a brake disk 142 fixed on said shaft. The band 141 is held from rotation by means of a pin 143 engaging lugs 144 on said band. A screw 145 provides means for regulating the pressure of the band 141 upon the brake disk 142.

The feed for the warp carriage 11 is sensitively controlled, the carriage being moved only as fast as the necessities of the work require. When warp threads are in position to be engaged by the selector 128 the feed of the warp carriage is suspended by means of a bell-crank lever 146 pivotally mounted at 147, one end of the upwardly-extending arm of said lever lying in the plane of the warp threads. A spring 148 tends to move said lever arm into contact with the warp threads. When warp threads are present at the selector mechanism the end of the horizontal arm 149 of said bell-crank lever lies in position to prevent a restoring movement of the pawl 137. When threads are absent from the selecting point, the spring 148 rocks the bell-crank lever to withdraw said horizontal arm from engagement with said pawl, and the carriage is fed along until a thread is in position to be taken by the selector 128.

The selected thread is separated from the body of the warp by means shown as a curved plate 150 fixed to arms 151, said arms being secured to a shaft 152 pivotally mounted in an arm 153. The operating edge of the plate 150 is inclined at an angle of about 30° with said shaft. At its point end it is provided with a separator finger 154 (Fig. 6ᵃ). The plate 150 is oscillated by means of a crank 155 (Fig. 4) fixed at the forward end of the shaft 152, which crank is connected by a connecting rod 156 with a crank arm 157 fixed upon the shaft 132 (Figs. 3 and 6). To the side of the separator plate 150 opposite to the finger 154 and at one end of its inclined separating edge is fixed a shear blade 158 adapted to coact with a stationary shear blade 159 fixed to the arm 153. As the separator plate 150 is oscillated the finger 154 enters between the selected thread and the body of warp threads, and the plate, following said finger, separates the selected thread from the adjacent threads substantially throughout its length between the clamps 12 and 13. When the operating edge of the plate 150 has passed the selected thread the latter has been raised from the body of warp threads so that it is cut between the two shear blades 158 and 159 as they come together. To clamp the thread before it is severed, in order that it shall not jump or become slack at the point end of the separator plate, I provide an arm 160 pivotally mounted upon the shaft 152 and arranged to clamp the thread between itself and the outer end of the forward one of a number of stationary fingers 161 (Fig. 7). A block 160ᵃ fixed to the arm 160 and having an inclined face raises the selected thread into proper position for clamping, if it has not already been so raised by the separator plate. A spring 162 (Fig. 5) tends to move the arm 160 into clamping contact with said finger, and a pin 163 fixed in one of the arms 151 withdraws the arm 160 upon the return movement of the separator plate.

Should the selector fail to take a thread, it is desirable to stop the heddle-handling mechanism while the selector mechanism continues to endeavor to take a thread. It will be seen that the heddle-handling mechanism is driven from the shaft 83, while the warp carriage and the warp-thread selecting and separating mechanisms are driven from the drive shaft 6. In order, therefore, to suspend the action of the heddle-handling mechanism I provide means for breaking the operative connection between the shafts 6 and 83, said means being automatically operated upon the failure of the selector to take a thread. This mechanism will now be described.

The stationary fingers 161 (Figs. 6ᵃ and 7) are located near the point end of the separator plate 150 and are formed on the arc of a circle to permit said plate to be oscillated beneath them. A fork 164 is pivotally mounted upon the shaft 152, the tines of said fork being adapted to enter between the fingers 161, which a spring 165 causes them to do when no thread extends across the ends of said fingers. The pin 163 swings the fork 164 rearwardly at each return movement of the plate 150. The upper end of the fork 164 is in the form of a rest 166, the upper end of said rest being curved on the arc of a circle concentric with the center of the shaft 152. A disk 167 is fixed upon said shaft, and has a notch 168 therein adapted to be engaged by a pawl 169 pivotally mounted on an arm 170, the latter being loosely mounted on the shaft 152. A pin 171 (Fig. 4) projects rearwardly from said pawl and normally lies upon the rest 166, by which means the pawl is held out of the notch 168. A spring 172 tends to move the pawl in one direction. When a thread has been selected, said thread lies in front of the fingers 161 and prevents the fork 154 from entering between said fingers. When the selector fails to take a thread the tines of the fork 164 are drawn by the spring 165 between the fingers 161, withdrawing the rest 166 from beneath the pin 171 and permitting the pawl 169 to enter the notch 168. When the return movement of the separator plate 150 begins the arm 170 is rocked downwardly, said arm being connected with a crank arm 173 by means of the connecting rod 174. The crank arm 173 is fixed to a shaft 174$^a$ carrying a fork 173$^a$ connected with a ring 84$^c$ rotatably mounted on the hub of the pin. disk 84. The downward movement just described of the arm 170 therefore shifts the pin disk 84 longitudinally of the drive shaft 6 to withdraw the pin 85 out of the vertical plane of the star wheel 87, and to engage the hub 84$^a$ of said pin disk with the stop wheel 87$^a$. When the separator plate 150 has nearly completed its return movement, a pin 175 on the connecting rod 174 engages the rear end of the pawl 169 and lifts the forward end thereof out of the notch 168 in order that the rest 166 may be placed beneath the pin 171 during the remainder of the return movement of the separator plate 150. As soon as the pawl 169 is disengaged from the notch 168, a spring 176 raises the arm 170 and the pawl 169 slightly, the leaf 84$^b$ on the hub of the pin disk 84 preventing disengagement of said hub and the stop wheel 87$^a$ until the pin 85 has passed the slots 86 in the star wheel 87, when the rotation of the leaf 84$^b$ out of contact with the stop wheel 87$^a$ permits the spring 176 to return the pin disk 84 into operative relation with the star wheel 87. If upon the next forward movement of the separator 150 and the fork 154 the latter is stopped by a selected thread, the rest 166 remains under the pin 171 and the heddle-handling mechanism will be actuated when the pin 85 engages the star wheel 87. If the fork 154 is not so stopped, the pin disk 84 is shifted away from the star wheel 87 upon the next return movement of the separator and before the pin 85 engages in a slot 86.

The reed $c$ is arranged to travel longitudinally of the bed 1 upon a channel track 177 vertically-adjustably mounted upon the posts or brackets 4$^a$ (Figs. 1, 4 and 6). Any suitable means may be employed for adjustably mounting the channel track 177. That herein-shown consists of wedging blocks 177$^a$ fixed to the track and resting upon pins 177$^b$ fixed in said posts. The blocks 177$^a$ are fixed to the posts by means of bolts 177$^c$ extending through inclined elongated openings 177$^d$ in the posts. The reed is fed through the machine and its dents spread for the passage of the drawing-in needle by a reed opener and feeder 178 (Figs. 18, 19 and 20) having a split flange 179 upon its periphery. The split ends of the flange are made thin so as to enter and leave the reed easily. The reed feeder and opener is supported in the machine frame with its split flange in position to engage the dents of the reed, and is rotated by the shaft 180 through the intermeshing bevel gears 181 and 182, a spur gear 183 secured to the bevel gear 182, an intermediate gear 184 and a pinion 185 fixed to the reed feeder and opener. The shaft 180 is provided with a pinion 180$^a$ meshing with a pinion 180$^b$ on the shaft 83. The gear train described gives the reed feeder and opener a succession of half-revolutions. In the present embodiment two threads are to be drawn between each two adjacent dents in the reed. Referring to Fig. 4 the reed opener and feeder is there shown stationary. The next half revolution of said device feeds the reed the distance of one dent and spreads the dents for the next forward movement of the needle. The next half revolution does not feed the reed but merely holds the same dents spread for the second forward movement of the needle. The succeeding half revolution feeds and spreads the reed as before described. The reed is held in an upright position by means of stationary members 186.

The needle 188 is secured in an arm 189 fixed to a shaft 190 supported in bearings upon the bed plate 1. At the opposite end of said shaft is a crank arm 191 (Fig. 3) which is connected with an eccentric 192 upon the shaft 6 by means of a connecting rod 193. The needle 188, which is formed on the arc of a circle generated from the center of the shaft 190, has a notch 194 formed in its top near its forward end, which notch is in such a position and of such form that when the needle is in its foremost position, the selected warp thread is moved into said notch by the thread-separating mechanism hereinbefore described. When the reed feeder and opener 178 has spread apart two dents of the reed, the needle 188 is projected through the reed and through the proper thread eye of a heddle. Upon its return movement, the needle 188 draws said thread through the heddle and the reed and through a twisting device to be next described.

The twister 195 (Figs. 18 and 19) comprises a housing 196 which is closed at its rear end by the member 197 (Fig. 19ᶜ) said member having an opening 198 therethrough for the passage of the needle 188. Within the housing 196 is rotatably mounted a disk 199 having an irregular opening 200 therein through which the needle passes. Fixed to the center of the rear wall of the housing is a conical stud 201. The inner face of the member 197 is lined with plush which is held in place by the ring 202 (Fig. 19ᵇ). The disk 199 is rotated by means of a bevel gear 203 fixed to the bevel gear 182 and meshing with a bevel pinion 204 fixed to a short shaft 205. Upon the forward end of the shaft 205 is a gear 206 meshing with an annular series of gear teeth 207 formed in the flange 199ª of the disk 199. In its rotation the twister disk 199 winds the end of the drawn-in thread about the projection 201, thus forming a twist coil which prevents the thread from being accidentally withdrawn from the reed.

The operation of the machine will be briefly described as follows: The harnesses are first moved over the harness bars 25 and 26 so that each harness will form a lease. In placing the harnesses over the bars 25 and 26 it is necessary (in the form of machine shown herein) to move the bar-supporting standard 27 from supporting position, (it being understood that the supplementary support Z is first moved into supporting position as has been previously explained). After the harnesses are moved onto the bars, the standard 27 is moved back into the supporting position and fixed as shown in Fig. 1. The supplementary standard or supporting bar Z is then dropped and secured to the bed out of the way of any of the operating parts. If, now, the belt is shifted from the pulley 7ª to the pulley 7 fixed on the shaft 6, the machine will be set in operation. As the shaft 6 rotates, motion will be imparted to the shaft 83 through the Geneva stop motion comprising the disks 84 and 87. The rotation of the shaft 83 will cause the shaft S to rotate and through the gears 92 and 93 motion will be imparted to the shaft 90 (see Figs. 2 and 2ª). The shaft 90 will impart movement to the cams 96 and 97 and 100 and 101. The cams 100 and 101 will impart a longitudinal reciprocatory movement to the bars 56, thereby actuating the pawls 55 and transforming the reciprocatory motion to rotary motion, which rotary motion is given to the eye puller and positioner comprising the disks D D′ (best shown in Figs. 15 and 17). The rotation of the eye puller and positioner, will impart a movement to the selector 61 because the disks D are provided with teeth 59ª which mesh with the pinion 59 to drive the selector 61 by its internal gear 62. When a heddle is picked up by the selector 61 it is moved toward the eye puller and positioner, and a pair of the fingers D² pass between the heddle strands below the eye and carry the eye toward the foot of the machine. The arms 74 are normally down, that is, as arranged three will be down while one is elevated. In every instance an arm will be in position to permit a heddle to pass over it as the heddle is moved into position to receive the thread from the needle. At this time the pin 80ª will rest in the recess 81. At about the time that the heddle eye is in the position shown in Fig. 15, the arm 74 will have passed upward on the inner side of the selected heddle and on the outside of the adjacent heddles. The action just described will be repeated each time a heddle is selected. The heddle farthermost to the left shown in Fig. 15 is in position to receive the needle, which may pass through the reed c and through the eye of the heddle, take a warp thread and draw it through the heddle eye, the reed and the twister, the latter causing the newly-drawn thread to intermesh with previously drawn threads and thus reduce the liability of the thread pulling out of the reed dent.

It sometimes happens that the heddles are not properly leased, or a heddle strand may be broken below the heddle eye. In either event, the proper heddle would not be selected. In view of the fact that the rod 68 is designed to reciprocate back and forth once for each time that a heddle is selected, the cam 70 on said rod will always be in approximately the position shown in Fig. 15, every time that the eye puller and positioner is actuated once; therefore, if no heddle is presented the spring 71 will cause the toe of the dog 64 to rise and throw the heel 66 into locking contact with the projection 69 of said rod and as a result the machine will be stopped. Just so long, however, as proper heddles are selected, one for each movement imparted to the eye puller and positioner, the rod 68 will be ineffective to stop the machine. The manner of throwing out certain mechanism when a proper warp thread has not been selected, has been previously described in detail and it is deemed unnecessary to reiterate the mode of operation.

When the warp threads have been drawn through the harnesses and the reed, the threads are released from the warp carriage 11 by opening the clamp 13, and the beam, harnesses and reed removed from the machine. As hereinbefore explained, the knee 40 is lowered when the harnesses and the reed are to be withdrawn. The beam truck and the warp carriage are returned to the head end of the machine in any suitable way.

I claim as my invention:

1. A warp-drawing machine having a stationary harness-supporting bar; withdrawable means at each end of said bar for supporting it, whereby the harness may be inserted over or slipped off the ends of said bar without removing said bar from the machine; a drawing-in mechanism; and means for traversing the harness on said bar past said mechanism.

2. A warp-drawing machine having a stationary harness-supporting bar; withdrawable means for supporting one end of said bar; withdrawable means for supporting said bar when the first mentioned supporting means is withdrawn; a drawing-in mechanism; and means for moving the harness past said mechanism.

3. A warp-drawing machine having a stationary harness-supporting bar; withdrawable means for supporting one end of said bar; intermediate means for supporting said bar; and means for preventing the other end of said bar from tilting upon said intermediate support when the first mentioned bar-supporting means is withdrawn.

4. A warp-drawing machine having two stationary harness bars; means comprising mechanism supported upon said bars for operating upon heddles; and a withdrawable support for said bars carrying actuating mechanism for the mechanism on said bars.

5. A warp-drawing machine having two stationary harness bars; means comprising mechanism carried by said bars for operating upon heddles; and a withdrawable support for one end of said bars, said support carrying actuating mechanism having a separable connection with the mechanism on said bars.

6. A warp-drawing machine having two stationary harness-supporting bars over which the heddles are leased, with the heddle eyes located between said bars, the harness being insertible onto said bars while said bars are in place in the machine, a stationary drawing-in mechanism located between the ends of said bars, said bars being long enough to support a harness at each side of said mechanism, and means for traversing the harness on said bars past said mechanism.

7. A warp-drawing machine having two stationary harness bars; a drawing-in mechanism; a heddle selector mounted on one of said bars; and a heddle tightener mounted upon the other bar.

8. A warp-drawing machine having two stationary harness bars over which a harness may be leased; a drawing-in mechanism; a heddle selector located between said bars; and means for moving the harness past said mechanism and said selector.

9. A warp-drawing machine having two stationary harness bars over which a harness may be leased; a drawing-in mechanism; a heddle selector supported upon one of said bars and located between said bars, and a heddle tightener supported by the other bar; and means for moving the harness past said mechanism, said selector and said tightener.

10. A warp-drawing machine having two stationary bars over which a harness may be leased; a drawing-in mechanism; and a gravity feed for moving the harness along said bars.

11. A warp-drawing machine comprising a stationary mechanism for operating upon heddles, and a gravity harness-feed controlled by said mechanism.

12. A textile machine having a gravity feed for a harness and a rotary device for governing said feed.

13. A rotary heedle selector having peripheral heddle-engaging means, said means alternately engaging a front and a rear heddle of a harness.

14. A rotary heddle selector having peripheral heddle-engaging notches, alternate notches being inclined in opposite directions.

15. The combination of a heddle selector adapted to lie between the heddle strands of a harness, and adapted to engage said heddle strands, and means for rotating said selector in the plane of the harness.

16. A heddle selector adapted to lie between the heddle strands of a harness, and notched to engage said heddle strands, successive notches being inclined in different directions.

17. In a textile machine, a supporting framework, a bar stationarily supported in said framework, over which bar heddles may be leased, a rotary selector stationarily mounted on said bar for rotation in the plane of the harness, and means for traversing the harness past said selector.

18. A harness feed for warp-drawing machines comprising a plurality of rotary heddle-engaging fingers.

19. A heddle feeding means comprising radial fingers having needle guides.

20. A heddle feeding means comprising radial fingers having heddle-receiving notches.

21. A heddle feeding means comprising radial fingers having needle guides and heddle-receiving notches.

22. In a warp-drawing machine, spaced heddle-supporting bars, and rotary heddle feeding means between said bars and provided with peripheral heddle-engaging fingers.

23. In a warp-drawing machine, spaced heddle-supporting bars and heddle-feeding means comprising radial notched fingers.

24. A warp-drawing machine comprising a plurality of harness supports, and a plurality of alternately operating rotary heddle-feeding devices, one of said devices having thereon needle guides adapted to aline with the eye of a heddle acted upon by an adjacent device.

25. In a textile machine, a harness bar, and a heddle feeding device carried by the harness bar.

26. In a textile machine, a rotary heddle selector, a rotary eye-positioning device, a driving connection between said selector and said device, and means for rotating the latter.

27. In a textile machine, a rotary heddle selector, a rotary eye-positioning device, a driving connection between said selector and said device, and means for intermittently rotating the latter.

28. In a textile machine, a rotary heddle selector and a rotary eye-positioning device comprising two disks, one at each side of said selector.

29. In a textile machine, a rotary heddle selector and a rotary eye-positioning device comprising two disks fixed with relation to each other and located at opposite sides of said selector, a driving connection between said eye-positioning device and said selector, and means for rotating the eye-positioning device.

30. In a textile machine, a supporting structure, a rotary eye-positioning device carried by said structure, a rotary heddle selector carried by said structure, internal gear teeth on said eye-positioning device and said heddle selector, and a pinion carried by said structure and meshing with said gear teeth.

31. In a textile machine, a rotary heddle selector and a rotary device alined with said selector for positioning the eye.

32. In a textile machine, a rotary heddle selector having alternately inclined notches, and a rotary heddle feed.

33. In a textile machine, a rotary heddle selector having alternately inclined notches, and a rotary heddle feed having fingers.

34. In a textile machine, a rotary heddle selector having alternately inclined notches, and a rotary heddle feeding device having heddle notches.

35. In a textile machine, a rotary heddle selector having alternately inclined notches, and a rotary heddle feeding device having fingers and heddle notches.

36. A harness feed for warp-drawing machines comprising a rotary heddle-engaging disk, in combination with a notched rotary heddle selector.

37. In a textile machine, a heddle selector, and a heddle feed in driving connection with said selector.

38. In a textile machine, a rotary heddle feed, and a rotary selector, one being driven from the other.

39. In a textile machine, a toothed selector; a toothed feeding device; and a gear between said selector and feeding device and in mesh with both.

40. In a textile machine, a heddle selector, a feeding device, and means on the feeding device for supporting the selector.

41. In a textile machine, a harness bar, heddle selecting and feeding mechanism carried by said bar, and means for actuating said mechanism.

42. In a textile machine, a rotary selector, a rotary heddle feeding device in gear with said selector, and a cam-actuated reciprocatory actuating-means for said feeding device.

43. In a textile machine, a rotary selector, a rotary heddle feeding device, and means for imparting movement to one of these at a different rate than the rate of movement of the other.

44. In a textile machine, a heddle eye puller and positioner, and tension devices for temporarily acting upon the heddles at about the time the eye puller positions a heddle.

45. In a textile machine, a heddle selector an eye-positioning device, and means for temporarily placing tension upon the strands of the positioned eye.

46. In a textile machine, a heddle eye puller and positioner, and take-up arms timed to act with said eye positioner.

47. In a warp-drawing machine, means for placing tension upon heddle strands comprising a pivoted arm adapted to engage said strands at its free end, and means for tilting said arm.

48. In a warp-drawing machine, means for placing tension upon heddle strands comprising a pivoted arm adapted to engage the strands at its free end, and yielding means for tilting said arm.

49. A warp-drawing machine having heddle-positioning means, a plurality of heddle-tensioning devices, and means for successively actuating said tensioning devices.

50. A warp-drawing machine having a bar over which a harness may be leased, and a heddle-tensioning arm pivoted upon each side of said bar.

51. In a textile machine, a heddle selector, a heddle puller, a heddle tension, means for causing the selector to feed a heddle to the heddle puller, and means for causing the tension to engage the heddle as it is fed to the puller.

52. A textile machine having a selector, a rotary positioner, and means coöperating with said positioner to render the machine inoperative when a heddle is not positioned.

53. A textile machine having a selector, a rotary eye puller, and means coöperating with said rotary eye puller to render the machine inoperative when a heddle is not selected.

54. A textile machine having a heddle selector, a heddle feeding device, and means, a portion of which is in the path of the heddle eyes, to render the machine inoperative when a heddle is not fed.

55. A textile machine having an eye-positioning device, a feeler adapted to lie between the heddle strands and be engaged by positioned heddle eyes, and means operated by said feeler to stop the machine when a heddle eye is not positioned.

56. A textile machine having an eye-positioning means, a pivoted feeler adapted to be depressed by a positioning heddle eye, a reciprocatory hook adapted to interlock with said feeler when the latter is not depressed, and means operated by said hook to stop the machine when a heddle eye is not positioned.

57. In a warp-drawing machine, a heddle-eye positioning means, a pivoted feeler arranged to be depressed by a positioning heddle eye, a reciprocatory member having a hook adapted to interlock with said feeler when the latter is not depressed, a projection for holding the feeler depressed during the interval between heddle eyes, and means operated by said reciprocatory member to stop the machine when a heddle eye is not positioned.

58. In a warp-drawing machine, a supporting structure having a web thereon, two disks rigidly secured together and rotatably mounted upon said web at opposite sides of said web, each of said disks having a peripheral series of heddle-engaging fingers, and means for rotating said disks.

59. In a warp-drawing machine, a bar over which heddles may be leased, said bar having a web upon its edge adjacent to the heddle eyes, two disks rigidly secured together and rotatably mounted upon said web at opposite sides of said web, the axis of said disks extending at right angles to the plane of the harness, each of said disks having a peripheral series of heddle-engaging fingers, and means for rotating said disks.

60. In a warp-drawing machine, a bar over which heddles may be leased, a device rotatably mounted upon the edge of said bar adjacent to the heddle eyes, said device being mounted for rotation in the plane of the harness, and said device comprising a peripheral series of heddle-engaging fingers, a heddle selector alined with and located in front of said device, and means for actuating said device and said selector.

61. In a warp-treating machine, the combination of a stationary warp-treating mechanism adapted to operate upon a transverse section of a warp, and means for moving a warp-beam with relation to said mechanism.

62. In a warp-drawing machine, the combination of a stationary drawing-in mechanism, and means for moving a warp-beam with relation to said mechanism.

63. In a warp-drawing machine, the combination of a stationary drawing-in mechanism, and warp-beam-moving means comprising a rotatory screw-threaded shaft extending longitudinally of the machine.

64. In a warp-drawing machine, means for supporting organized loom harness, a warp carriage have two warp clamps arranged in approximately the same horizontal plane, whereby a sheet of warp threads held by said clamps is presented in substantially horizontal position, means for movably supporting said carriage alongside the harness-supporting means, means for selecting individual threads from the sheet of warp threads, means for drawing selected threads through loom harness carried by said harness-supporting means, and means for causing relative movement between the harness and sheet of threads, on the one hand, and the selecting and drawing means on the other.

65. In a warp-drawing machine, means for supporting loom harness, a warp carriage having two warp clamps arranged in approximately the same horizontal plane, whereby a sheet of warp threads held by said clamps is presented in substantially horizontal position, means for supporting said carriage to move longitudinally of the harness-supporting means, means for selecting individaul threads from the sheet of warp threads, a swinging arm, a drawing-in needle carried by said arm and adapted to draw the selected threads through the eyes of loom harness carried by said harness-supporting means, and means for moving the carriage and the harness past said selecting and drawing means.

66. In a warp-drawing machine, means for supporting loom harness, a warp carriage having two warp clamps arranged in approximately the same horizontal plane, whereby a sheet of warp threads held by said clamps is presented in substantially horizontal position, said sheet of threads and the heddle eyes being in approximately the same horizontal plane, means for supporting said carriage to move longitudinally of the harness-supporting means, means for selecting individual threads from the sheet of warp threads, and means for drawing the selected threads through the heddle eyes.

HOWARD D. COLMAN.

Witnesses:
Wm. D. Hintze,
Louise A. Culver.